United States Patent
Henty

(10) Patent No.: US 8,456,534 B2
(45) Date of Patent: Jun. 4, 2013

(54) MULTI-DIRECTIONAL REMOTE CONTROL SYSTEM AND METHOD

(75) Inventor: David L. Henty, Newport Beach, CA (US)

(73) Assignee: I-Interactive LLC, Irvine, CA (US)

( * ) Notice: Subject to any disclaimer, the term of this patent is extended or adjusted under 35 U.S.C. 154(b) by 1181 days.

(21) Appl. No.: 11/255,647

(22) Filed: Oct. 21, 2005

(65) Prior Publication Data

US 2007/0058047 A1 Mar. 15, 2007

Related U.S. Application Data

(60) Provisional application No. 60/622,143, filed on Oct. 25, 2004.

(51) Int. Cl.
*H04N 5/225* (2006.01)
*H04N 9/04* (2006.01)

(52) U.S. Cl.
USPC ..................... 348/207.99; 345/157

(58) Field of Classification Search
USPC .......................................... 345/157
See application file for complete search history.

(56) References Cited

U.S. PATENT DOCUMENTS

| | | | |
|---|---|---|---|
| 5,045,843 A | 9/1991 | Hansen | |
| 5,181,181 A | 1/1993 | Glynn | |
| 5,227,985 A | 7/1993 | DeMenthon | |
| 5,388,059 A | 2/1995 | DeMenthon | |
| 5,461,478 A | 10/1995 | Sakakibara et al. | |
| 5,565,673 A * | 10/1996 | Choi | 250/227.11 |
| 5,594,469 A | 1/1997 | Freeman | 345/158 |
| 5,617,312 A | 4/1997 | Iura et al. | |
| 5,644,126 A | 7/1997 | Ogawa | |
| 5,675,390 A | 10/1997 | Schindler et al. | |
| 5,686,942 A | 11/1997 | Ball | |
| 5,712,658 A | 1/1998 | Arita | 345/158 |
| 5,784,282 A | 7/1998 | Abitbol et al. | |
| 5,786,804 A * | 7/1998 | Gordon | 345/158 |
| 5,795,306 A | 8/1998 | Shimotani et al. | |
| 5,818,424 A | 10/1998 | Korth | |
| 5,856,844 A | 1/1999 | Batterman et al. | |

(Continued)

FOREIGN PATENT DOCUMENTS

| | | |
|---|---|---|
| EP | 0767443 A2 | 4/1997 |
| JP | 7121293 A | 5/1995 |

(Continued)

OTHER PUBLICATIONS

International Search Authority/US, The International Search Report and the Written Opinion for PCT/US06/41306 dated Apr. 25, 2007, 7 pages.

(Continued)

*Primary Examiner* — Anthony J Daniels

(57) ABSTRACT

A multi-directional remote control system and method is adapted for use with an entertainment system of a type including a display such as a monitor or TV and having display functions employing a mouse type control. The remote controller may be conveniently held in one hand of a user and still provides full mouse type functionality. The remote control system and method images the screen of the TV or other display to detect relative motion between the controller and screen. This position information is transmitted to the entertainment system for control of a cursor or other GUI interface.

15 Claims, 8 Drawing Sheets

U.S. PATENT DOCUMENTS

| | | | |
|---|---|---|---|
| 5,874,936 A * | 2/1999 | Berstis et al. | 715/785 |
| 5,926,168 A | 7/1999 | Fan | |
| 6,154,199 A | 11/2000 | Butler | 345/167 |
| 6,417,836 B1 | 7/2002 | Kumar et al. | |
| 6,456,728 B1 | 9/2002 | Doi et al. | |
| 6,522,312 B2 | 2/2003 | Ohshima et al. | |
| 6,538,645 B1 | 3/2003 | Juang et al. | |
| 6,661,450 B2 * | 12/2003 | Yata | 348/169 |
| 6,720,949 B1 | 4/2004 | Pryor et al. | |
| 6,750,848 B1 | 6/2004 | Pryor | 345/168 |
| 6,791,531 B1 * | 9/2004 | Johnston et al. | 345/157 |
| 6,795,068 B1 | 9/2004 | Marks | |
| 6,863,609 B2 | 3/2005 | Okuda et al. | |
| 6,921,332 B2 | 7/2005 | Fukunaga et al. | |
| 6,967,695 B2 | 11/2005 | Hoshino | 348/734 |
| 6,978,475 B1 * | 12/2005 | Kunin et al. | 725/106 |
| 6,987,504 B2 | 1/2006 | Rosenberg et al. | |
| 7,061,527 B2 * | 6/2006 | Miyahara | 348/220.1 |
| 7,489,299 B2 | 2/2009 | Liberty et al. | |
| 8,013,838 B2 | 9/2011 | Hsu et al. | |
| 2002/0039111 A1 | 4/2002 | Gips et al. | |
| 2002/0126090 A1 | 9/2002 | Kirkpatrick et al. | |
| 2003/0037335 A1 | 2/2003 | Gatto | 725/37 |
| 2003/0037341 A1 | 2/2003 | Van Der Meulen | |
| 2003/0052859 A1 | 3/2003 | Finley | |
| 2003/0222849 A1 | 12/2003 | Stark Weather | 345/156 |
| 2004/0001043 A1 | 1/2004 | Lin | 353/30 |
| 2004/0027328 A1 | 2/2004 | Tang | 345/157 |
| 2004/0095317 A1 | 5/2004 | Zhang | 345/158 |
| 2005/0022250 A1 * | 1/2005 | Nishioka et al. | 725/131 |
| 2006/0050052 A1 | 3/2006 | Mekenkamp et al. | |
| 2006/0287083 A1 | 12/2006 | Ofek et al. | |
| 2007/0257884 A1 | 11/2007 | Taira et al. | |
| 2007/0273464 A1 | 11/2007 | Kitahara et al. | |
| 2008/0024435 A1 | 1/2008 | Dohta | |
| 2008/0100825 A1 | 5/2008 | Zalewski | |
| 2009/0009596 A1 | 1/2009 | Kerr et al. | |

FOREIGN PATENT DOCUMENTS

| | | | |
|---|---|---|---|
| JP | 08-071252 | | 3/1996 |
| JP | 9034633 A | | 2/1997 |
| JP | 09-134250 | * | 5/1997 |
| JP | 11-305935 | | 11/1999 |
| JP | 2000181601 A | | 6/2000 |
| JP | 2001236181 A | | 8/2001 |
| JP | 2002-081909 | | 3/2002 |
| JP | 2005021458 A | | 1/2005 |
| JP | 2006079249 A | | 3/2006 |
| JP | 2007005983 A | | 1/2007 |
| KR | 20040027541 | | 4/2004 |
| WO | 95/19031 | | 7/1995 |
| WO | 00/60534 A1 | | 10/2000 |
| WO | 2005/062273 A1 | | 7/2005 |

OTHER PUBLICATIONS

Murph, "Sony patents LED-infused, motion-tracking controller", retrieved on May 3, 2007, at <<http://www.engadget.com/2006/12/14/sony-patents-led-infused-motion-tracking-controller/>>, engadget, Weblogs, Inc., Dec. 14, 2006, pp. 1-6.

PCT Search Report for Patent Application No. PCT/US2007/015216, Mailed on Feb. 11, 2008, 13 pgs.

Cutler, et al., "View-based interpretation of real-time optical flow for gesture recognition," Proc. Third IEEE Conference on Face and Gesture Recognition, Nara, Japan, Apr. 1998, 6 pages.

Hinckley, et al., "The VideoMouse: A Camera-Based Multi-Degree-of-Freedom Input Device," UIST '99, ACM 1999, CHI Letters, vol. 1, pp. 103-112.

"SmartNAV3 AT: How It Works," available at <<http://www.naturalpoint.com/smartnav/products/at/at_howitworks.html>> accessed on Apr. 19, 2006, 2 pages.

TrackIR product description, available at <<http://www.naturalpoint.com/trackir/02-products/product-how-TrackIR-works.html>> accessed on Apr. 19, 2006, 2 pages.

Supplementary European Search Report from European Application No. 06826481.1 dated Aug. 18, 2011, 8 pages.

\* cited by examiner

MULTI-DIRECTIONAL REMOTE CONTROL SYSTEM AND METHOD

RELATED APPLICATION INFORMATION

The present application claims priority to provisional application Ser. No. 60/622,143 filed Oct. 25, 2004, the disclosure of which is incorporated herein by reference in its entirety.

BACKGROUND OF THE INVENTION

1. Field of the Invention

The present invention relates to remote control systems for controlling entertainment systems, such as televisions, multimedia systems, Internet access systems and browsers, and related methods.

2. Description of the Prior Art and Related Information

A need has arisen for providing multi-directional mouse type control capabilities in the living room along with the ability to control the conventional entertainment devices typically present in the living room. For example, combined PC and TV systems have been introduced which integrate the capabilities of the personal computer with the television. One such system is described in U.S. Pat. No. 5,675,390. Also, set top Internet access devices have been introduced which integrate Internet access capabilities with conventional televisions. The ability to provide full control of a PC or an Internet browser typically requires the use of a keyboard and a multi-directional controller such as a mouse. A conventional remote control is therefore inadequate for control of such combined entertainment systems. Also, the advent of digital video recorders (DVRs), wireless networking systems for video, audio and picture transfer to TVs, and other digital devices linked to the TV has introduced many more functions to TV control, including complex display menus, introducing a need for a better remote control interface.

Wireless keyboards are one addition to the conventional remote control in the living room that have been introduced to allow the user of a combined PC and TV system or the user of a TV Internet access device to provide convenient text input, for example for creating emails or searching. However, convenient control of PC type functions also requires an ability to interface with a Graphical User Interface (GUI). To address this need wireless keyboards may include an up-down-left-right control to move around in a limited GUI interface. This type of up-down-left-right control is also typically added to conventional remotes and used to navigate a cable TV menu or digital TV peripheral device menu, such as a DVR. This type of up-down-left-right control is more restricted and clumsy to use than a mouse type controller and limits the flexibility of a GUI interface and the menu layout. Alternatively, wireless keyboards may include an integrated trackball or other pointing device to provide mouse type control of the PC or Internet functions. These types of multi-directional controls are less natural and convenient to use than a separate mouse controller. Also, such systems require both hands to use making simple one handed navigation of a GUI TV interface impossible. A wireless mouse controller is an option, however, a mouse requires a clean flat surface within easy reach and is not convenient for a living room setting. Some attempts have been made to provide a mouse type controller suitable for living room use, for example, using gyroscopic motion detection, however such controllers suffer from various problems such as cost, complexity and lack of naturalness of use. Furthermore, to provide all the desired types of controls of a PC/TV entertainment system three separate wireless remote controls would be needed, a hand-held remote control, a wireless keyboard and a freely movable mouse type control. This of course introduces undesirable cost, a confusing number of control functions, and clutter in the living room.

Accordingly, the addition of complex digital devices as well as PC and/or Internet access capabilities to the conventional TV based entertainment system has introduced the problem of controlling such systems with a convenient yet full function remote control system.

SUMMARY

In a first aspect the present invention provides a method for remote control of a media system including a display using a remote control having a camera. The method comprises displaying an image on the display using the display, capturing image data of the displayed image and display screen using the camera on the remote control, and determining image position information from the captured image data. The method further comprises controlling at least a portion of the displayed image in response to movement of the remote control using the detected position information.

In a preferred embodiment of the method for remote control of a media system, displaying an image comprises displaying a graphical user interface or video game. The image displayed by the display may include a distinctive boundary or marker and determining image position information may comprise detecting the distinctive border or marker. For example, the displayed image may comprise externally provided images and the distinctive boundary or marker is superimposed on the externally provided images. Determining image position information may also comprise detecting the display screen boundary. The graphical user interface displayed may include a cursor and controlling at least a portion of the displayed image may comprise controlling the position of the displayed cursor. Alternatively, controlling at least a portion of the displayed image may simply comprise selectively highlighting portions of a graphical user interface or may comprise control of motion in a video game. Controlling at least a portion of the displayed image using the position information may also comprise wirelessly transmitting the position information from the remote control to the display or a device coupled to the display. The position information may preferably be derived from offset information of a detected characteristic feature of the imager data from the camera optical axis.

According to another aspect the present invention provides a method for remote control of an entertainment system including a television display. The method comprises displaying an image comprising a menu on the television display in response to activation of a control input on the remote, the menu including channel information, entertainment system control information, or internet access information. The method further comprises capturing image data of the television display including the menu using an imager in a freely movable remote control and detecting characteristic image features of the menu or the display screen boundary. The method further comprises providing multi-directional control of the display from changes in the detected characteristic image features due to movement of the remote control.

In one preferred embodiment of the method for remote control of a media system the multi-directional control of the display may comprise providing rapid scrolling through listed TV channels in response to movement of the remote control. The characteristic image features of the menu may comprise a menu boundary or a marker displayed on the menu. Also, the characteristic image features of the menu may comprise a characteristic color of the boundary or marker. The multi-directional control may comprise converting detected motion of the remote control to a sequence of up, down, left or right coded control pulses and transmitting the sequence of pulses to the television display or device coupled to the display.

According to another aspect the present invention provides an entertainment system and remote control combination. The combination comprises a television display and a device integrated with, or separate and coupled to, the display for controlling display of images on the display including externally provided internet information and television images, the device including processing circuitry for providing a distinctive boundary or marker on the displayed image. The combination also includes a freely movable remote control including an on board imager and optics adapted to capture image data including the displayed image, processing circuitry for detecting the distinctive boundary or marker and deriving multi-directional position control information, and transmission circuitry for transmitting the position control information to the device or display.

In a preferred embodiment of the entertainment system and remote control combination the distinctive boundary or marker may comprise a boundary or marker with a characteristic brightness, color or shape. For example, the distinctive boundary may have a brightness allowing distinctive detection of the edge of the display surrounding all or part of the image.

According to another aspect the present invention provides a remote control adapted for use with a television display providing a displayed image on a television screen. The remote control comprises an imager, optics associated with the imager allowing a field of view including the television screen and processing circuitry for detecting at least one of the screen boundary, a distinctive boundary displayed on the screen or a distinctive marker displayed on the screen and detecting movement of the remote control using the detected information. The remote control further comprises transmission circuitry for transmitting multi-dimensional control information derived from the detected movement.

In a preferred embodiment the remote control may further comprise processing circuitry providing universal remote control pulses in addition to the multi-directional control information and/or processing circuitry for providing universal remote control pulses derived from the detected movement.

Further features and advantages of the present invention are set out in the following detailed description.

DETAILED DESCRIPTION OF THE INVENTION

Figure 1:
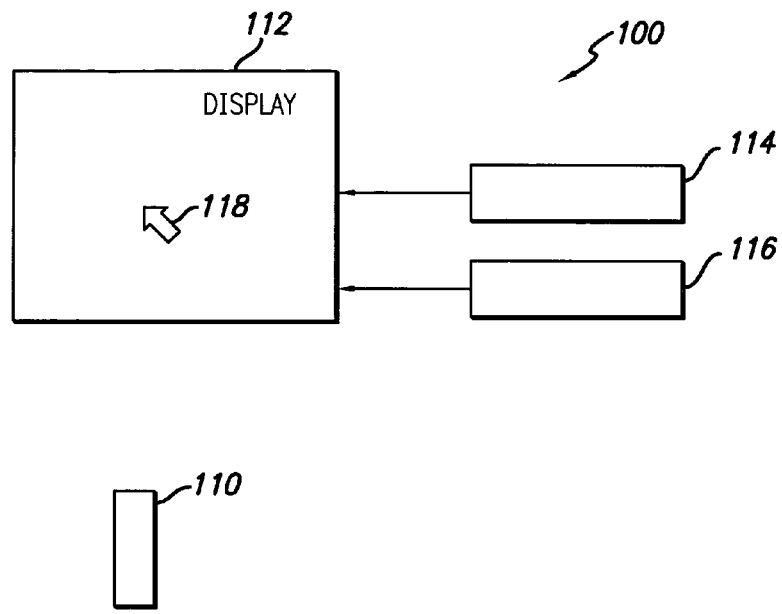
FIG. 1 is a perspective view of an improved entertainment system in accordance with the present invention in a presently preferred embodiment.

The present invention provides a remote control system and method adapted for use with an entertainment system employing a multi-directional control function such as a GUI control interface. Any such multi-directional control capability is referred to herein, for shorthand purposes only, as a GUI interface. In FIG. 1 an improved entertainment system in accordance with the present invention is illustrated in a perspective view in a presently preferred embodiment. Details of such systems beyond the novel control features described herein are known and will not be described in detail herein. For example, a PC/TV system with internet access is one example of such an entertainment system and is disclosed in the above noted '390 patent, the disclosure of which is incorporated by reference in its entirety.

Referring to FIG. 1, the entertainment system 100 includes a multi-directional remote controller 110, a display 112, which for example may be a TV monitor, a primary display control/input device 114 and a secondary display control/input device 116. Primary display control/input device 114 and secondary display control/input device 116 may comprise any of a variety of devices using a TV display for output. Primary control/input device 114 is adapted for a GUI interface control displayed on the display 112. For example, the primary input device 114 may comprise a multi-media PC such as in the above noted '390 patent or other device adapted for utilizing a multi-directional control, such as a GUI interface. Other examples of primary input device 114 include digital cable or satellite TV boxes, DVR systems, networked digital media systems adapted for media transfer from a networked PC, internet steaming media devices, digital video game players, etc. A variety of possible devices may therefore comprise primary input device 114. Furthermore the functionality of input device 114 may be incorporated in the television system 112 and is simply illustrated as a separate device for illustration of one possible configuration. Secondary input device 116 may also comprise any of a variety of known devices employed in entertainment systems and may include a DVR, cable TV box, or other digital or combined analog and digital interface device. Device 116 may incorporate a GUI type interface or a more conventional interface for TV systems adapted for, e.g. a push button LED remote control. Also, the functionality of device 116 may be incorporated along with device 114 or TV 112 and again the illustration of a separate input device is purely for illustration of a possible configuration and without limitation. Plural devices 114, 116 are shown to clarify that the control system of the present invention may control a conventional device as well as a GUI device, with an (optional) combined universal remote/multi-directional control capability in one embodiment of a controller 110 as described below.

Remote controller 110 provides a multi-directional control capability which is schematically illustrated by control of cursor 118 displayed in the monitor 112. It should be appreciated however that a variety of different multi-directional control interfaces may be employed other than a cursor such as in a typical mouse control of a PC. For example the multi-directional controller 110 may control highlighting and selection of different icons or other GUI interface layouts displayed on the screen of TV monitor 112 by device 114 and/or device 116. Also, the multi-directional controller could simply enable rapid scrolling through large channel lists such as in digital cable menus without the tedious up-down-left-right scrolling typically employed. As will be described in more detail below, remote controller 110 employs a freely movable multi-directional motion based control similar to a mouse control of a PC but without being limited to use on a flat surface.

Figure 2:
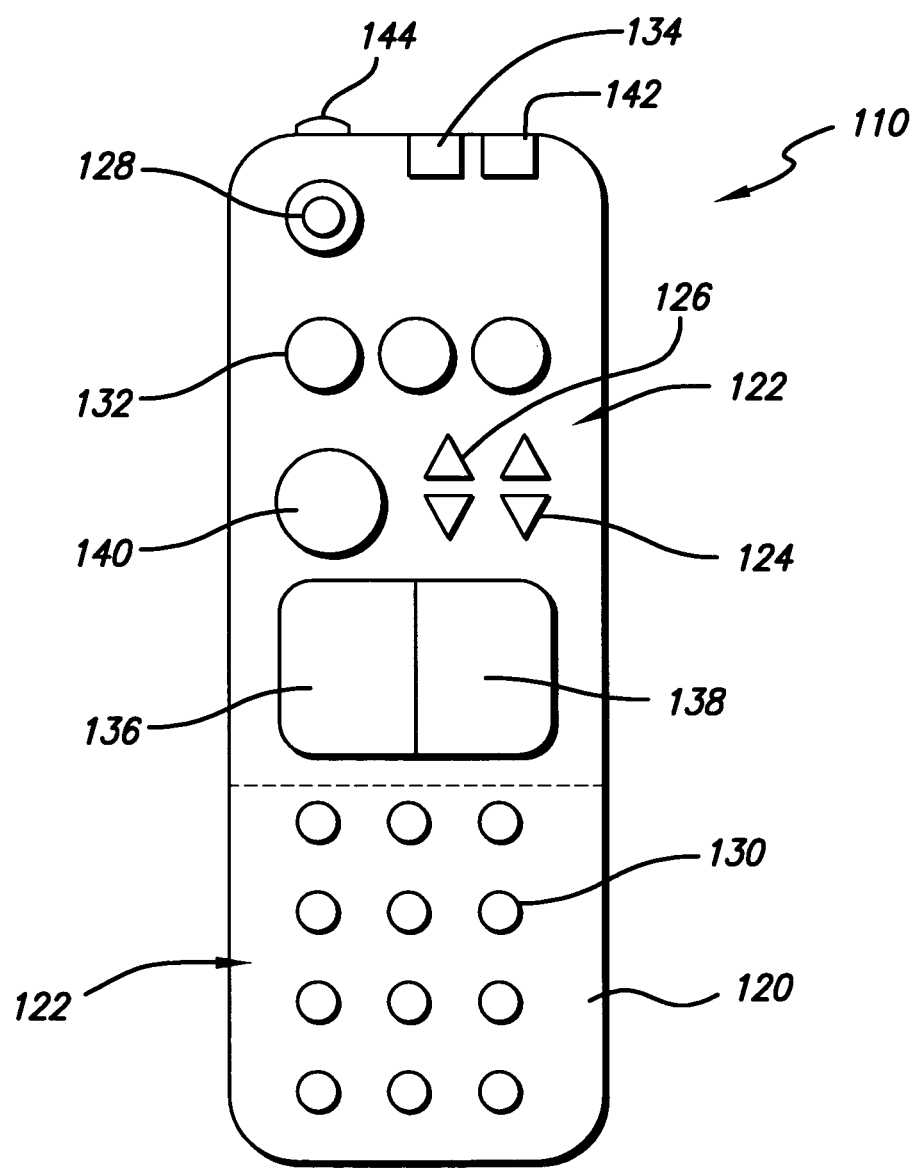
FIG. 2 is a top view of the remote controller of the present invention in a presently preferred embodiment.

Referring to FIG. 2, the remote controller 110 is illustrated in more detail in a top view. As shown, the remote controller may have a configuration similar to a typical remote control employed in an entertainment system. Alternatively, the controller 110 may have a shape more similar to a mouse type controller or other desirable ergonomic configuration adapted for use in one hand in a living room setting. The top surface of the controller housing 120 may include a number of first remote control inputs indicated generally at 122. This first set of control inputs 122 may include conventional remote control functions typically found in hand-held TV remote controls or universal remote controls adapted to control multiple entertainment devices such as TVs, VCRs, CD players, DVD players, etc. Therefore the first set of remote control inputs 122 may include the volume up and down set of controls 124, a channel up and down set of controls 126, a power button 128 and a set of numeric inputs 130. Also, a number of programmable or special purpose control buttons may be provided that are indicated generally as buttons 132. The first set of controls 122 activate a first wireless transmitter 134 which may preferably be an LED or RF transmitter configured at one end of the housing 120. As further illustrated in FIG. 2, the remote controller 110 preferably includes mouse type control buttons 136, 138 which comprise a second set of control inputs. Normally the multi-directional control will not be needed and may be disabled for power saving purposes. For this purpose a button 140 may be provided to activate the second set of inputs and the multi-correctional control capability of the controller 110. Button 140 may at the same time transmit a control signal to the control input device 114 to display a suitable menu adapted for multi-directional control on the display screen 112. Although one button 140 is shown several menu buttons may be provided which enable display of the appropriate menu and at the same time enable the multi-directional control capability. For example, activating a channel button would activate display of a channel list menu and simultaneously enable the multi-directional control for rapid scrolling through the channels. Alternatively, the multi-directional control may only be active while button 140 is held depressed. Activation of the button 140 may also deactivate some or all of the first set of remote control inputs 122 so that these are not inadvertently activated while the user operates the mouse type control buttons 136 and 138. Alternatively a movable cover may be provided over the first set of inputs 122 to cover these while the multi-directional control function is enabled; for example a sliding type cover may be provided for this purpose or a hinged section with inputs 112 on the inner section or sections as shown by the dashed line. Alternatively, in some applications the remote control inputs 122 may not be needed; for example in an application where the controller 110 is used in conjunction with a separate remote or with a keyboard having control functions and the controller 110 is used solely as a multi-directional input device, some or all of the controls 122 may be dispensed with. Also, some or all of the functions of inputs 122 may be allocated to GUI control on the screen. Also, the buttons 136, 138 may not be activated by separate button(s) 140 but may be active all the time and operate as a conventional "action" or "select" button when operating in a non GUI control mode and operate to select and/or provide mouse button type selection when the multi-directional control mode is active. Although two buttons 136, 138 are shown similarly to a mouse a single button may be employed (or more than two, or a scroll wheel may be added, e.g. for rapid channel navigation). The control signals from the control inputs 136, 138 and the multi-directional control signals are provided to a second transmitter 142 which may also preferably comprise either a LED or RF type wireless transmitter. Alternatively, in some applications, e.g. video game control, a wired rather than wireless transmission between the controller and device 114 may be preferred. As further shown in FIG. 2, a lens assembly 144 is provided at the front of the housing to allow the capture of image data including the display screen 112 for provision to a digital camera (or imager) and image signal processing system described in more detail below.

The controller 110 may also provide various degrees of enhanced "universal control" GUI capability over various devices, such as device 116 or TV 112. For example, most such devices will have up-down-left-right controls and associated LED control pulses control the associated menu. If control of such devices using controller 110 is employed, the detected motion of the controller 110 (described in detail below) can be converted to a high speed series of up, down, left or right LED pulses coded for the particular device being controlled. In this way more convenient navigation of conventional menus can be provided by controller 110. Alternatively, device 114 may include an LED "blaster" or direct connection to other devices (e.g. via a USB port) to provide such universal control.

Figure 3:
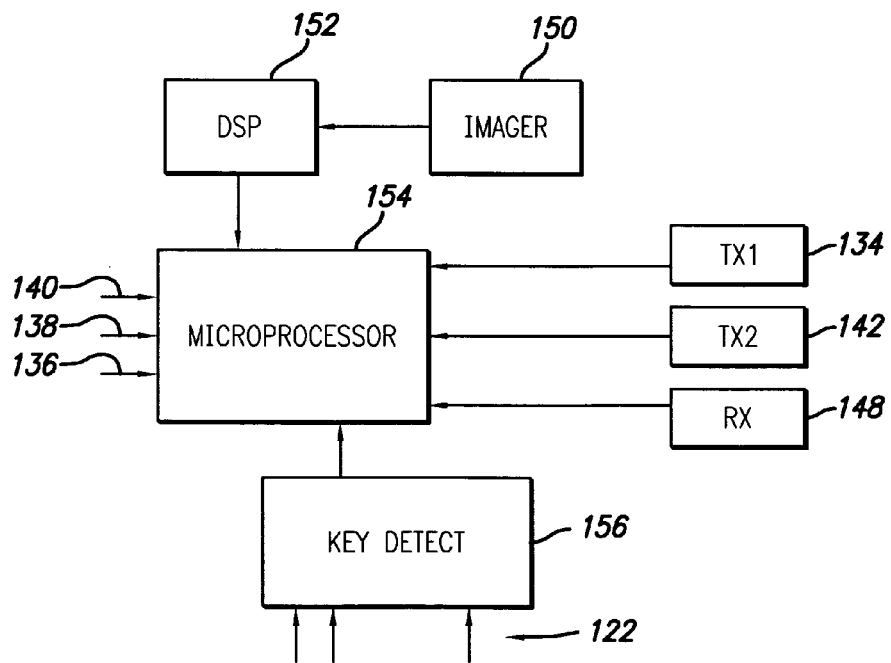
FIG. 3 is a block schematic diagram illustrating control circuitry of the remote controller of the present invention.

Referring to FIG. 3, a block schematic diagram is illustrated showing the circuitry of the remote controller. As shown in FIG. 3, the controller circuitry includes an imager 150 which receives light captured by lens 144. Imager 150 may comprise a suitable commercially available digital imager, for example commercially available CMOS imagers providing relatively high-quality digital images are available at relatively low cost and may be advantageously employed for imager 150. The output of imager 150 will be image data corresponding to the pixels in the field of view of the imager 150, which field of view is suitably chosen by lens 144 to encompass the area in front of the controller including the display screen 112 shown in FIG. 1. The pixel data output from imager 150 is provided to a signal processor 152 which may be a suitably programmed DSP programmed in a manner to provide the image processing functions described in more detail below. The output of the DSP 152 will be data preferably corresponding to the position off set of the image of screen 112 shown in FIG. 1 from the image axis of the optics of remote controller 110. Alternatively, the data may correspond to changes in image position between frames. This position data is provided to microprocessor 154 which controls first transmitter 134 to transmit the position data to the output control device 114 (or 116) shown in FIG. 1. Microprocessor 154 will also receive inputs from switches 136 and 138 corresponding to the multi-directional control buttons shown in FIG. 2. These will also be provided to first transmitter 134 and provided to control/input device 114 (or 116)

for control of the GUI functions of the display 112. The microprocessor 154 also receives inputs from activation of keys 122 (shown in FIG. 2) provided from key detect circuit 156. This key activation data is provided by microprocessor 154 to second transmitter 142 and is transmitted to the appropriate input device 114, 116 or to TV 112. Two transmitters 134 and 142 may be advantageously employed were the control signals from switches 122 provide a conventional LED type control signal which may be used for standard remote control functions in components in the entertainment system illustrated in FIG. 1. Transmitter 134 in turn may be optimized to transmit the position information and is preferably insensitive to the orientation of the control relative to the input device (114) containing the receiving circuitry. Therefore, transmitter 134 may be a sufficiently high bandwidth RF transmitter. Alternatively, however, transmitter 134 may also be an LED type transmitter. Also a single transmitter may be employed for transmitting both types of signals under the control of microprocessor 154. Microprocessor 154 may also store codes for universal control operation. An (optional) receiver 148 may also be provided, e.g. to receive a signal from device 114 that the multi-directional control menu has exited allowing controller 110 to disable the imager and DSP for power saving. Alternatively, as noted above, the multi-directional control may only be active while a button is held depressed. Alternatively, a timer may put the imager and DSP in a sleep mode if a certain time has elapsed without use of a GUI control button. Alternatively, the controller 110 may detect when the menu has exited, for example, by detecting absence of a suitable boundary or marker superimposed on the menu and disable the camera and DSP. Other information may also be received from device 114, e.g. to customize the control functions for different GUI interfaces. If device 114 has a networked wireless interface, such as a WiFi interface, controller 110 may also employ this protocol and be networked with device 114. Microprocessor 154 also receives as an input the control signal from switch 140 which, as noted above, may conveniently activate a menu or other interface signaling activation of the multi-direction controller function and a GUI interface and optionally deactivate the control inputs 122. Although the microprocessor 154 and DSP 152 are shown as separate processors in FIG. 3, it will be appreciated that the functionality of these two processors may be combined into a single microprocessor and the specific illustrated configuration of the circuitry in FIG. 3 is purely one example for illustrative purposes.

Figure 4:
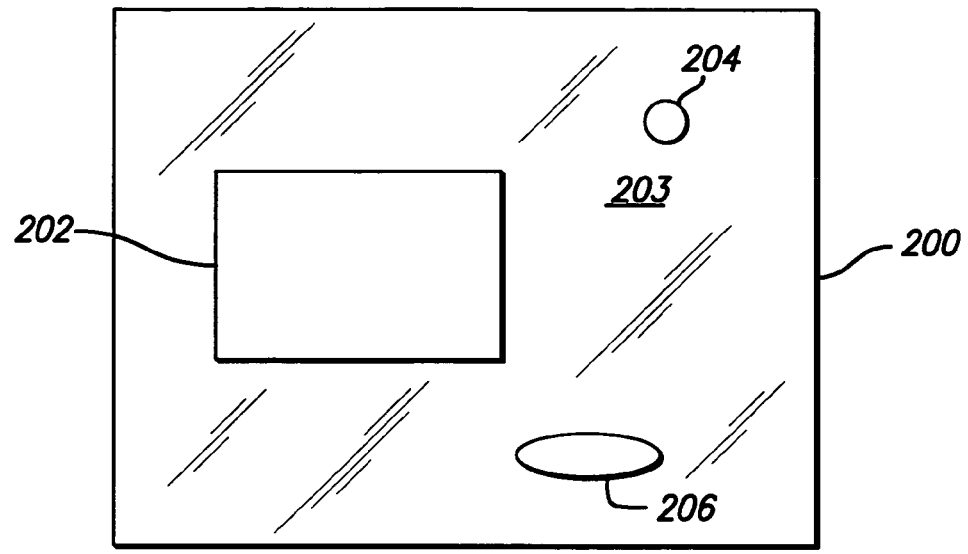
FIG. 4 is a schematic diagram illustrating the image data captured by the remote controller of the present invention including the display screen of the entertainment system of FIG. 1.

Next, referring to FIGS. 4-6 the image processing implemented by DSP 152 in FIG. 3 will be described in more detail. First of all, referring to FIG. 6 the first stage in the image processing is to capture a frame of image data as illustrated at 300. In FIG. 4 the image data captured by imager 150 is illustrated. As shown, the field of view 200 includes image data (pixels) 202 corresponding to the display screen 112 shown in FIG. 1 as well as background image data 203. The image data 202 for the display screen has several characteristics which distinguish it from the background and which allow it to be reliably detected by the image processing software. These characteristics include the following: the image data 202 from the display screen will be brighter than the background; the boundary of the image data 202 of the display screen will have straight edges; the image 202 will have a rectangular shape; and the image 202 will have a substantial size in comparison to other objects in the total field of view 200. These characteristics may be employed to eliminate the irrelevant background images and clearly discern the image 202. Also, the menu or other GUI displayed on the screen may be supplanted with specific features adapted for detection, as discussed below.

Figure 6:
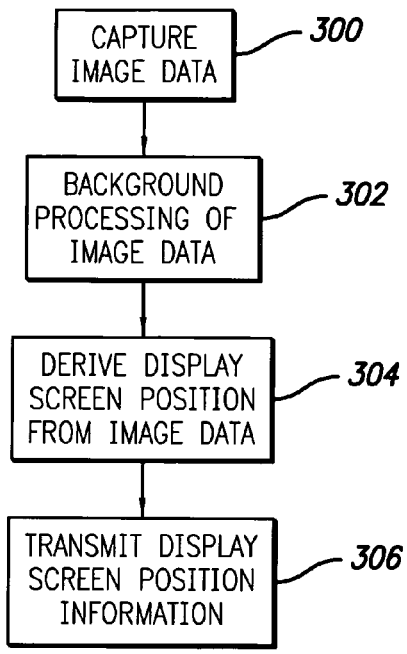
FIG. 6 is a flow diagram illustrating the processing of image data by the remote controller of the present invention.

Next, referring to FIG. 6, at 302, the DSP image processing proceeds to eliminate background image data and isolate the image data for screen image 202. This processing employs some or all of the above noted unique characteristics of the image 202 to eliminate the background image data. In particular, as shown in FIG. 4 by the shaded area, a majority of the background image data 203 will have a brightness substantially less than image data 202 and this portion of the background can be rejected by rejecting the pixel data below a reference brightness threshold. The remaining groups of image data will correspond to relatively bright objects which may occur in the field of view, illustrated for exemplary purposes in FIG. 4 by image data 204, 206. For example, such image data may correspond to a bright object such as a lamp's image data 204. Also, reflected image data 206, for example corresponding to a reflection off of a coffee table or other reflective surface in the field of view may be present. Image data 204 and 206 may be readily eliminated by using additional characteristics of the desired data 202. For example, the undesired image data will in general not have straight edges and not be rectangular in shape and therefore may be readily eliminated by the signal processing. This will employ edge or boundary detection which may be easily performed since the surrounding pixel data has been eliminated by the background processing described above and a simple comparison of pixel values will derive the boundaries of the screen image 202. Also, reflections of the display screen itself may be eliminated by doing a comparison of the brightness of the two images and selecting the brighter of the two objects. Furthermore, the reflections may be substantially eliminated from the image data by employing a polarized filter in the lens assembly 144. If background image data survives which satisfies these characteristics, a comparison between image data 202 and the surviving image data in the background can be made to determine the relative size of the two objects and the smaller object eliminated.

Figure 9A:
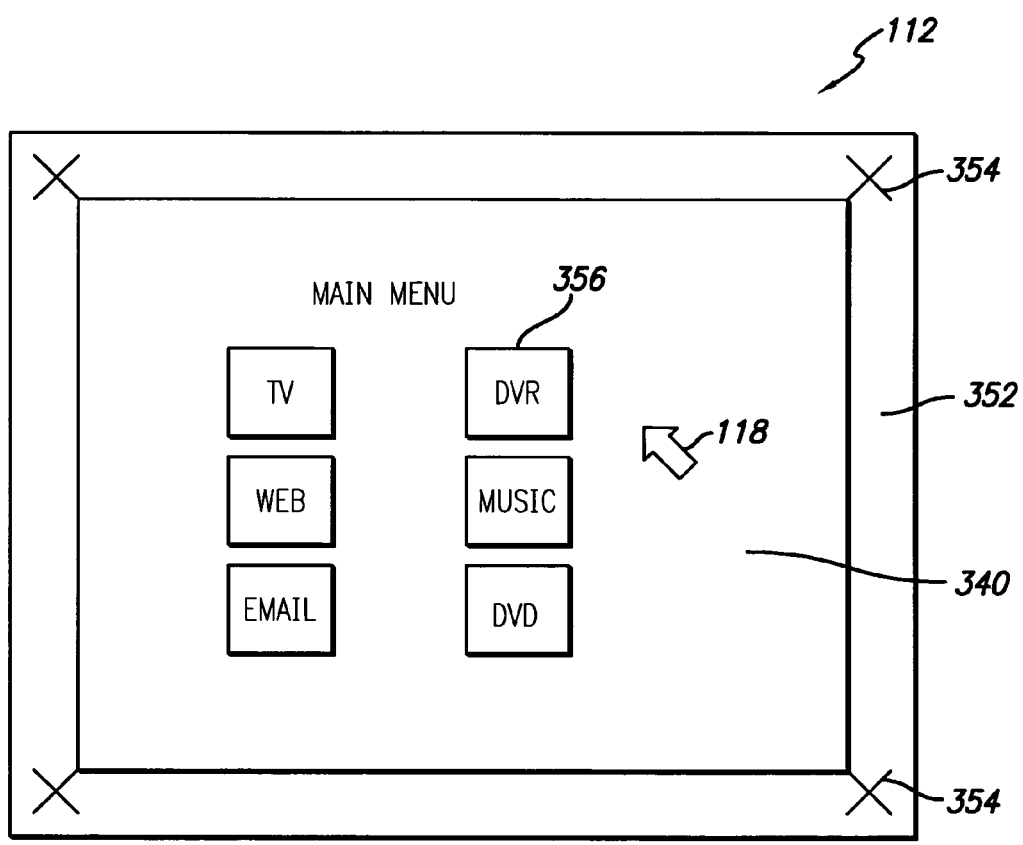
FIGS. 9A and 9B illustrate display menus having a bright boundary and/or markings for use in image isolation.
Figure 9B:
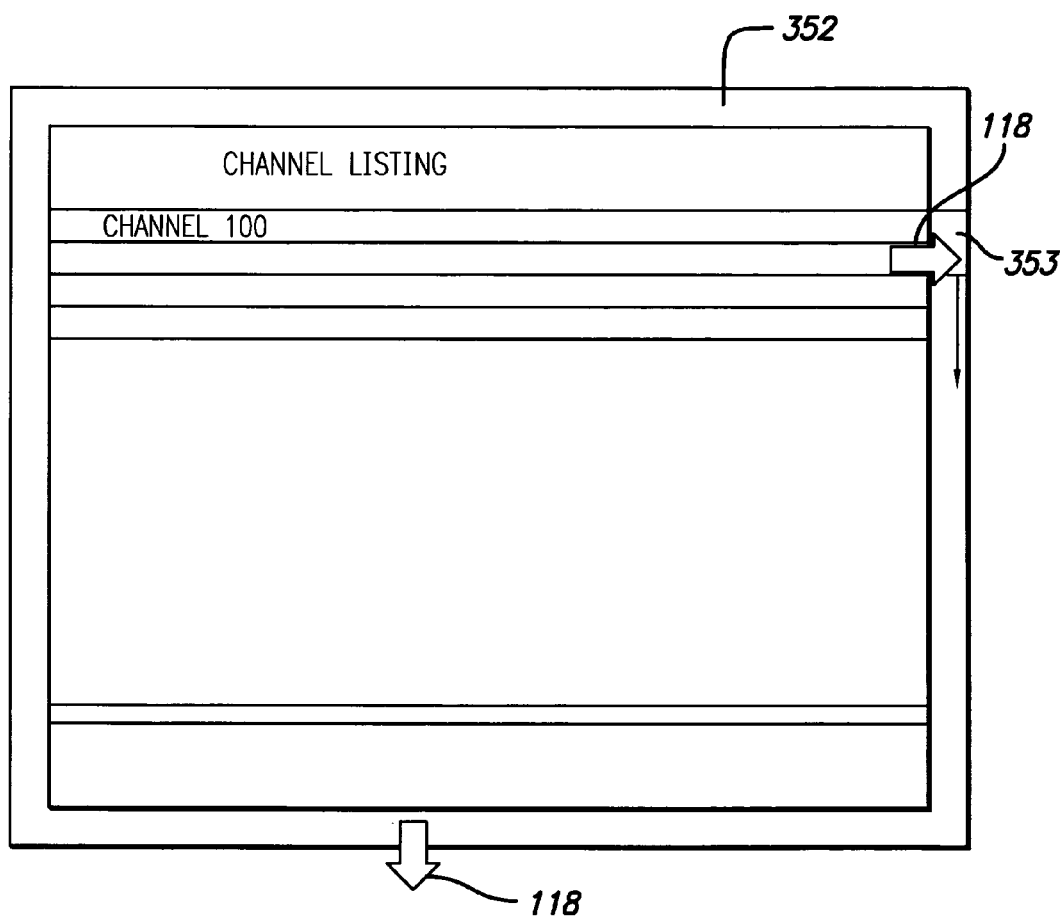

Additionally, since the image displayed in the display screen image 202 is under the control of the input/control device 114 the image 202 may be provided with a distinct characteristic to enable its ready detection against the background image data in the field of view 200. This display will typically correspond to a unique menu or other GUI interface which can be provided with a bright boundary, or distinctive bright readily identified position markers, e.g. in the four corners of the image 202. This may be superimposed on a standard browser or menu, for example. One simple example is illustrated in FIG. 9A which illustrates a display menu having a bright background 340. Alternatively a bright boundary 352 may be provided or markings 354. Four corner markings 354 are shown which may be aligned with image center and which may be relatively small bright markers. Also these may be combined with boundary 352 with a characteristic contrast. Also, a distinctive color or combination of colors may be employed for boundary 352, markers 354 or both. As another example a logo or name of the device manufacturer (e.g. DVR manufacturer) or service provider (e.g. cable company) may be used as a unique marker 354. If the logo or name includes text standard OCR processing may be used to match the detected combination of letters to a stored template for reliable marker detection. Another example of a menu layout is shown in FIG. 9B. It will be appreciated that a variety of different suitable boundaries and/or markings may be employed to help in distinguishing the image data for the screen 112 from background image data. Such characteristics of the display may be combined with or substituted for the above noted characteristics for detection of image data 202. For example, if discrete markers 354 are employed their unique characteristics may be substituted for the rectangular shape and straight boundaries of the screen image described above to distinguish from background. As another example, if color of the boundary or marker is used, initial color discrimination may be used to reject the background.

In the unlikely event that the image processing locks onto an incorrect object a simple reset may be provided, e.g. using button 140 or some other manually activated input, and upon reset activation a further characteristic may be employed, namely position relative to the center of the field of view with objects far away from the center being rejected. This allows the user to reset the image tracking system, for example if it inadvertently locks onto a window in a room, after pointing the controller at the display screen and hitting a reset button.

Figure 5:
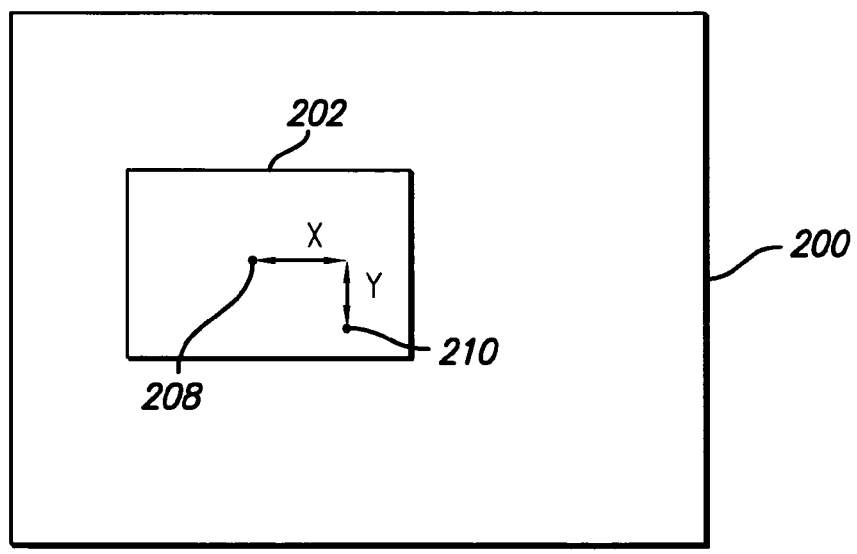
FIG. 5 is a schematic diagram illustrating the image data after background processing, which image data corresponds to the desired display screen image data, and derived relative position information.

After the above noted processing the remaining image data corresponds to the desired display screen image data 202, as generally illustrated in FIG. 5. The processing flow then proceeds to derive the center of the display screen image from this remaining image data at processing step 304, illustrated in FIG. 6. This may employ the rectangular image boundaries if these have been used at processing 302 or symmetric markings 354 if these are used. The process flow next proceeds to derive the relative position of the center of the screen image 208 to the center 210 of the field of view 200 (and the center of the optical axis of the controller lens assembly). As shown in FIG. 5, this offset information may be readily calculated from the image center pixel information derived previously and offset values X,Y may be derived as shown. This relative position data is transmitted to the input/control device 114 as shown at 306 in FIG. 6. It should be appreciated that other offset position references may be employed than image center. For example, top (and/or bottom) and side boundary offset values may be derived and transmitted to the device 114 as position information. Alternatively, marker position offset(s) from the imager optical axis may be determined and transmitted as position information. Adjustment for tilt may be provided during this processing, for example, by rotating the image data about the center of the imager field of view until the edges of the screen or marker correctly align with the edges of the pixel array before determining offsets. Alternatively, purely image feature motion detection may be used for the multi-directional control, without employing the relative position offset of the imager axis to the detected image feature. Instead changes in the position of the detected image feature between frames may be used to provide motion control. The position information transmitted at 306 may then be just the change in image position from a prior frame. This approach may also provide correction for tilt, for example, by rotating the image feature detected at each frame about the imager center to match the prior frame before determining the change in position. However, while the approach using imager axis offset information allows either pointing position based or motion based control, this approach only allows the latter.

In some applications with sufficiently high data rate transmissions provided, some of the above image processing may be performed in device 114 rather than in the controller and relatively large amounts of raw image data transferred. This may reduce the processor size on the controller and reduce battery drain. Alternatively, it should also be appreciated that some or all of the processing described below as performed in device 114 may be performed on board the controller 110.

Figure 7:
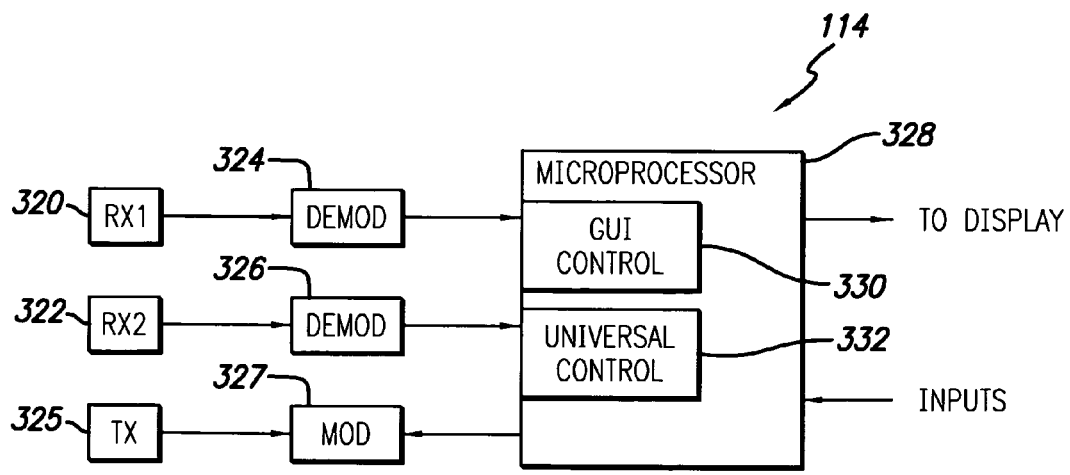
FIG. 7 is a simplified schematic of the display control/input device of the system of FIG. 1.
Figure 8:
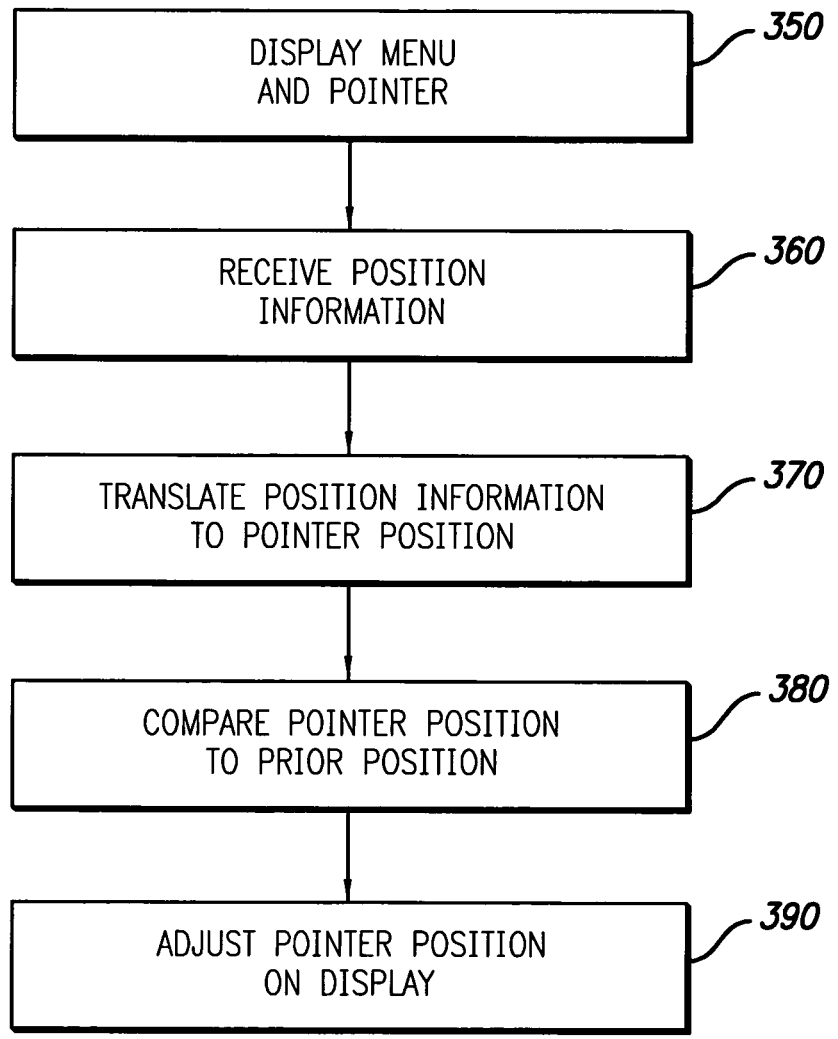
FIG. 8 is a flow diagram illustrating the process flow of the display control/input device for converting the received position data to a cursor or other GUI multi-directional control function.

Next, referring to FIGS. 7 and 8 the control processing using the received position data, provided by the input device 114, is shown. More particularly, in FIG. 7 a simplified schematic of the input/control device 114 is shown and in FIG. 8 a process flow is illustrated for the translation of the position data into cursor control of a GUI interface on the display screen 112, shown in FIG. 1. As shown in FIG. 7 the input device 114 will include a receiver 320 for receiving the position data as well as, optionally, a second receiver 322 for receiving the remote-control input signals from the control inputs 122 on the remote-control. Also, receiver 322 may be in device 116. The receivers 320, 322 are coupled to suitable demodulation and amplification circuits 324, 326, respectively which in turn provide the received data to a microprocessor 328. A transmitter 325 and modulator 327 may also be provided to communicate with the controller 110 or a networked wireless device. Microprocessor 328 will perform a number of functions which will depend on the particular device and will include additional functional blocks 330 and 332 for providing control of a GUI interface based on received position data from the controller in functional block 330 and optionally additional remote-control functions from the other inputs 122 in block 332. Although these functional blocks are illustrated as part of the system microprocessor 328 it will be appreciated they may be also provided as separate circuits or separately programmed microprocessors dedicated to the noted functions.

Referring to FIG. 8, a simplified process flow for converting the received position data to a multi-directional control function is illustrated. As shown at 350, the process flow begins when a GUI or other multi-directional control mode is entered and the appropriate display will be provided on the display screen 112. As noted above, this display screen may preferably have a bright background or may include additional bright boundaries or other characteristic markings which may assist in the accurate identification of the screen image data from background image data. Two simple examples of such a menu screen are shown in FIGS. 9A and 9B, discussed above. A number of GUI icons 356 are also illustrated in FIG. 9A along with pointer 118. In FIG. 9B a scroll bar 353 is shown, e.g. for rapid channel selection. If the pointer control function is used in web navigation, a bright boundary or marker may be superimposed on the web pages displayed. Next as shown at 360 in FIG. 8 the process flow activated by entry into the multi-directional control mode operates to receive the position information from the controller 110 provided from receiver 320. At 370 the received position information is then processed and translated to cursor position information. Converting the position information to cursor position control information at 370 may employ a variety of different functions depending on the particular application and entertainment system configuration and intended use. In general, this translation operation will provide a mapping between the received position information and cursor position based on a sensitivity which may be user adjustable. In particular, the user may choose to adjust the sensitivity based on how close the screen is to the user which will affect the amount of angular motion of the controller 110 required to move the cursor a particular amount in the display screen. Also, the processing at 370 may employ as an input the aspect ratio of the screen and an aspect ratio of the detected image data 202 may be derived (by the microprocessor 154 or by the DSP 152 in controller 110 and transmitted along with the position information). These two aspect ratios may be compared to derive an angle at which the user is configured relative to the screen and this angle may be used to adjust the sensitivity of the received position to cursor map at 370. That is, when the user is directly in front of the screen movement of the controller will require the maximum angular movement to move the cursor in the horizontal direction and the control sensitivity of the map of position information to cursor control at 370 may be made more sensitive. Conversely, when the angle of the user relative to the screen is greater a smaller movement of the controller will cover the range of cursor movement in the horizontal direction and a less sensitive mapping at 370 may be employed. In this way the control function will have the same feel irrespective of position of the user. Similarly, compensation processing may be provided at 370 for tilt of the controller field of view relative to the screen as well as vertical angle adjustment. Next at 380 the process flow proceeds to compare the change in cursor positions (and/or change in position data) between different frames of image data to smooth out the cursor control. This processing at 380 may be employed to reject jitter by averaging motion over several frames of image data or by rejecting sudden irregular changes. Such jitter rejection processing may also be adjustable by the user. Finally at 390 the cursor position (or other position indicated) on the display is updated and the modified GUI screen is displayed.

In another implementation, the cursor itself may be chosen as the unique marker displayed on the menu (or other GUI image displayed on the screen by device 114) and its position offset from the imager's center axis detected. The device 114 will then perform processing to move the displayed cursor to eliminate the offset. In other words the cursor will be moved to where the controller imager axis is pointing. Alternatively, as noted above, instead of controlling a cursor the multi-directional control may control highlighting of menu items or in a video game application control movement in the video game.

As noted above the use of detected image feature/imager axis position offset for motion control of the GUI screen allows either remote pointing position or motion control to be employed. That is the GUI cursor or highlighting control will either be based on where the remote is pointing on the screen or will simply change based on the change in the imager axis offset position from frame to frame. The latter control is of a familiar type to computer users familiar with mouse control and may be preferred where the primary use of the remote control is in a PC/TV type multi-media system for controlling the PC type functions or in an internet access enabled TV based multi-media system. The pointing position based control in turn may be preferred for TV menu control, especially for users unfamiliar with mouse control of a PC, or for video game control. Also, the preferences may change between modes of the multi-media system. For example in a multi-media system with internet access, digital TV, and video game capability it may be desirable to switch modes from pointing position to motion control depending on what aspect of the system is in use. Also, it may be desirable to allow users to choose their preferred control mode. Therefore, in another aspect of the invention one of the buttons illustrated on the remote control 110 may be a mode selection button and initiate a corresponding processing mode in the DSP 152 or the control 100 or in the device 114 in microprocessor 328 to optionally provide pointing position or motion based control.

In an embodiment where the controller operates with more conventional devices by providing suitable coded high speed left-right-up-down control pulses (e.g. LED pulses) to simulate the use of left-right-up-down buttons processing may be provided to convert the detected position reference information to control pulses transmitted to device 116 or TV 112. This processing may be performed on controller 110. Alternatively, if the universal control is provided via a device 114 specially adapted for universal control in conjunction with the controller 110 then this processing may be provided in device 114 and the other device(s) (e.g. 116) controlled via an LED blaster or direct connection such as a USB port.

Figure 10:
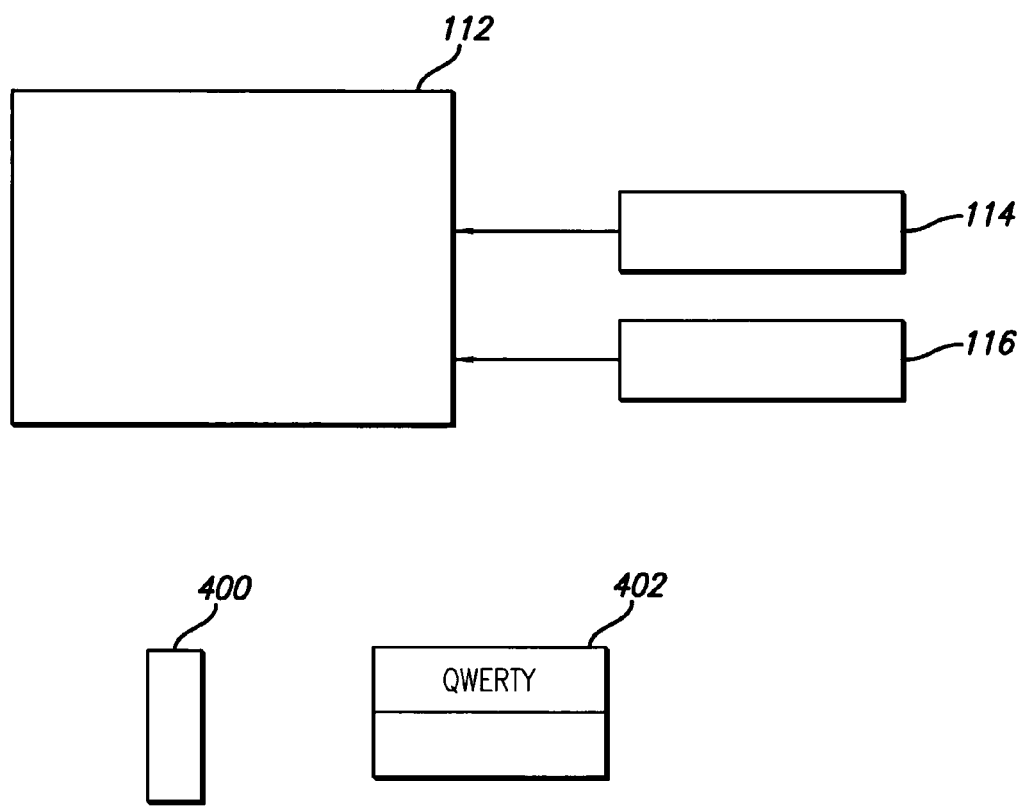
FIG. 10 is a perspective view of an alternate embodiment of the remote controller of the present invention employing a folding configuration with a text entry keyboard.

Referring to FIG. 10, an optional or alternate embodiment of the system of FIG. 1 is illustrated employing a combined multi-directional controller and wireless keyboard 400. The multi-directional capability of controller 400 may be precisely the same as described above in relation to the controller 110 of the prior embodiments but in addition a keyboard configuration 402 for text entry may be provided. More specifically, the controller 400 may have a folding housing with the keyboard 402 configured in the interior of the controller 400. This embodiment may incorporate the teachings of U.S. Pat. No. 6,094,156, the disclosure of which is incorporated herein by reference in its entirety, and accordingly the details of such an alternate embodiment need not be described in further detail since the necessary modifications to controller 110 are apparent from the aforementioned patent. It should be appreciated that such an embodiment may also optionally include inputs 122 described above and provide the capabilities of three distinct devices normally provided by separate controllers, namely a universal remote control, multi-directional control and keyboard text entry control normally found in three separate remote control devices.

Other implementations may be provided that may not be preferred in many applications but may be suitable in others. For example, a unique marking (such as 354 in FIG. 9) may be provided on the front of display 112 or device 114, e.g. by a pattern of LEDs or illuminated distinctive logo. This could be imaged instead of screen 112 and used to detect controller motion for pointer control as above. Alternatively, in such an embodiment, a distinctive angle sensitive marking may be provided and motion detected by detection of the changes in brightness of the detected markings. For example, a light source covered with a transparent diffractive pattern, e.g. a hologram or diffractive grating may be used. In yet another embodiment a unique marking may be provided on controller 110 and imaged by device 114 to detect motion. In this embodiment, the imager 150 is configured in device 114 and the process flow of FIGS. 5-6 is performed in processor 128. All such embodiments are implied herein.

It will be appreciated that the before mentioned embodiments of the invention may provide a variety of different capabilities depending on the particular application and system. In one aspect, the controller 110 may be operated as a primary control for a GUI based interface for a TV or other display based entertainment or information system with the functionality normally provided by a universal remote provided by the GUI interface and controlled by the multi-directional controller and the additional controls 122 shown in FIG. 1 need not be provided without loss of functionality. Alternatively, the controls 122 may be provided with the remote controller 110 providing a combined multi-directional controller and universal remote in one simple handheld configuration. Either embodiment may advantageously be used in a TV/cable/DVR environment or in a TV/PC enhanced environment and provide enhanced functionality. One example of the advantages of such control in a digital cable TV environment is apparent from FIG. 9B. As shown, with scroll bars and selected speed scrolling (by positioning the pointer below the listing a desired amount to control scrolling speed) the navigation of hundreds of channels may be greatly simplified. Also, in another configuration the multi-directional control capabilities may be combined with a separate wireless keyboard to provide enhanced functionality for PC/TV type systems or Internet access systems. Alternatively, the controller may provide multi-directional control and text entry in the embodiment of FIG. 10. Also, the combination of universal remote, multi-directional controller and text based input may all be provided in a single compact handheld configuration in the embodiment of FIG. 10. In another application the device 114 may be a video game device or incorporate video game capabilities and the remote control may provide a control over the video game replacing a joystick or other multi-directional controller.

It will be appreciated by those skilled in the art that the foregoing is merely an illustration of the present invention in currently preferred implementations. A wide variety of modifications to the illustrated embodiments are possible while remaining within the scope of the present convention. Therefore, the above description should not be viewed as limiting but merely exemplary in nature.

What is claimed is:

1. A method comprising:
receiving image information from a video camera, the image information capturing a scene which includes at least part of a display device, wherein:
the video camera is affixed to a user-manipulated device configured for carrying by a user; and
the user-manipulated device comprises a remote control device or a controller;
identifying a plurality of reference fields in the image information to provide identified reference information for controlling an application displayed on the display device, wherein the plurality of reference fields are displayed as part of graphical information displayed on the screen of the display device, the user-manipulated device capable of identifying the plurality of reference fields based on colors of the plurality of reference fields, based on shapes of the plurality of reference fields, and based on patterns of elements that comprise each reference field of the plurality of reference fields;
generating position information based on the identified reference information, the position information expressing a position of the user-manipulated device relative to at least one reference field associated with the display device, wherein the position of the user-manipulated device is calculated based on a position of the video camera associated with the user-manipulated device; and
controlling the application based on the generated position information.

2. The method of claim 1, wherein the receiving of the image information comprises receiving image information in response to the user pointing at a particular object being presented by the display device with the user-manipulated device.

3. The method of claim 1, wherein the plurality of reference fields comprise at least two reference fields arranged diagonally opposed to one another at opposite corners of the screen of the display device.

4. The method of claim 3, wherein the plurality of reference fields each include a plurality of reference elements.

5. The method of claim 4, wherein the plurality of reference elements of a first reference field are arranged in a different pattern from the plurality of reference elements of a second reference field.

6. The method of claim 1, wherein the controlling of the application involves determining an object displayed on the screen of the display device that the user is pointing at with the user-manipulated device.

7. An apparatus including logic configured to implement the receiving, identifying, generating, and controlling of claim 1.

8. A system comprising:
a user-manipulated device, the user-manipulated device including a video camera associated therewith;
a display device for presenting objects generated by an application;
at least one reference field incorporated as graphical information displayed on a screen of the display device to provide reference information for controlling an application displayed on the display device, the user-manipulated device capable of identifying the at least one reference field based on one or more colors of the at least one reference field, based on a shape of the at least one reference field, and based on a pattern of elements that comprise the at least one reference field; and
a position determination module configured to: receive image information from the video camera, the image information capturing a scene which includes at least part of the display device, wherein the user-manipulated device is carried by a user and the video camera moves with the user-manipulated device;
identify said at least one reference field in the image information to provide identified reference information; and
generate position information based on the identified reference information, the position information expressing a position of the video camera relative to said at least one reference field.

9. The system of claim 8, wherein said at least one reference field comprises plural reference fields arranged at respective positions with respect to the display device.

10. The system of claim 8, wherein said at least one reference field comprises a defined pattern of plural reference elements.

11. The system of claim 10, wherein:
the at least one reference field comprises at least a first reference field and a second reference field; and
the plural reference elements of a first reference field are arranged in a different pattern from the plural reference elements of a second reference field.

12. The system of claim 8, wherein the user-manipulated device is a game controller and the application is a game.

13. A system comprising:
a user-manipulated device, the user-manipulated device including a video camera associated therewith;
a display device for presenting objects generated by an application;
a plurality of reference fields placed at defined positions relative to the display device, each reference field comprising a plurality reference elements arranged in a pattern, wherein a first pattern of a first plurality of reference elements differs from a second pattern of a second plurality of reference elements; and
a position determination module configured to:
receive image information from the video camera, the image information capturing a scene which includes at least part of the display device, wherein the user-manipulated device is carried by a user and the video camera moves with the user-manipulated device;
identify said at least one reference field in the image information to provide identified reference information; and
generate position information based on the identified reference information, the position information expressing a position of the video camera relative to said at least one reference field.

14. The system of claim 13, wherein at least some of the plurality of reference elements comprise discrete mechanisms coupled to the display device.

15. The system of claim 13, wherein at least some of the plurality of reference elements comprise graphical information displayed on the display screen.

\* \* \* \* \*